(12) United States Patent
Allen et al.

(10) Patent No.: US 9,114,779 B2
(45) Date of Patent: Aug. 25, 2015

(54) HIGH VOLTAGE LITHIUM ION POSITIVE ELECTRODE MATERIAL WITH IMPROVED CYCLE LIFE

(75) Inventors: Jan L. Allen, Silver Spring, MD (US); T. Richard Jow, Potomac, MD (US); Jeffrey Wolfenstine, Silver Spring, MD (US)

(73) Assignee: The United States of America as represented by the Secretary of the Army, Washington, DC (US)

(*) Notice: Subject to any disclaimer, the term of this patent is extended or adjusted under 35 U.S.C. 154(b) by 1004 days.

(21) Appl. No.: 13/153,577

(22) Filed: Jun. 6, 2011

(65) Prior Publication Data

US 2012/0208067 A1    Aug. 16, 2012

Related U.S. Application Data

(60) Provisional application No. 61/422,310, filed on Feb. 14, 2011.

(51) Int. Cl.
*H01M 10/0525*    (2010.01)
*B60R 22/46*    (2006.01)

(52) U.S. Cl.
CPC ..... *B60R 22/4628* (2013.01); *B60R 2022/4647* (2013.01)

(58) Field of Classification Search
CPC .................. H01M 4/5825; H01M 10/0525
USPC ......... 429/213.95, 221, 223, 229, 224, 218.1, 429/23.95, 218.11
See application file for complete search history.

(56) References Cited

U.S. PATENT DOCUMENTS

| | | |
|---|---|---|
| 5,910,382 A | 6/1999 | Goodenough et al. |
| 6,391,493 B1 | 5/2002 | Goodenough et al. |

(Continued)

FOREIGN PATENT DOCUMENTS

JP    09134724    *   5/1997

OTHER PUBLICATIONS

A.K. Padhi et al., Phospho-olivines as Positive-Electrode Materials for Rechargeable Lithium Batteries, Journal Electrochem. Soc., Apr. 1997, vol. 144, p. 1188-1194.

(Continued)

*Primary Examiner* — Ula C Ruddock
*Assistant Examiner* — Thomas Parsons
(74) *Attorney, Agent, or Firm* — Eric Brett Compton

(57) ABSTRACT

A lithiated metal phosphate material substituted by divalent atoms at the M2 site and trivalent atoms, a portion of which are present at both the M2 and the M1 sites. The substituted material has the general formula of $Li_{1-3t}M^{2+}_{1-t-d}T_t^{3+}D_d^{2+}PO_4$, wherein M is selected from the group consisting of $Mn^{2+}$, $Co^{2+}$, $Ni^{2+}$ and combinations thereof; T is selected from the group consisting of $Fe^{3+}$, $Al^{3+}$ and $Ga^{3+}$ and a portion of said T resides at the M2 sites, said portion being greater than 0 and no more than 99 percent of the total T atoms; D is selected from the group consisting of $Fe^{2+}$, $Mn^{2+}$, $Co^{2+}$, $Ni^{2+}$, $Mg^{2+}$, $Zn^{2+}$, $Ca^{2+}$ and combinations thereof; d has a value greater than 0 and no more than 0.3; and t has a value in the range of 0 to 0.3. Also disclosed are electrodes which incorporate the substituted metal phosphate material and are disposed in electrochemical cells as well as batteries, including rechargeable lithium ion batteries. Finally, there is disclosed a method of increasing the life cycle of an electrode by forming the electrode by mixing and dissolving $LiH_2PO_4$, $Co(OH)_2$ and $FeC_2O_4 \cdot 2H_2O$ in $HNO_3$, evaporating the water from this solution to form a solid powder mixture, heating said mixture to around 600° C. under $N_2$ for approximately 12 hours, cooling, ball milling for about 30 minutes the mixture with 0.01-10 wt. % acetylene black; heating the mixture again to around 600° C. under $N_2$ for about an hour and then coating the mixture onto an Al foil substrate to produce a composite electrode.

19 Claims, 8 Drawing Sheets

(56) References Cited

U.S. PATENT DOCUMENTS

| | | | |
|---|---|---|---|
| 6,514,640 B1 | 2/2003 | Armand et al. | |
| 7,338,734 B2 | 3/2008 | Chiang et al. | |
| 7,986,124 B2 * | 7/2011 | Stone et al. | 320/106 |

OTHER PUBLICATIONS

A. Pujana et al., Synthesis and structural study of the LiFeCoPO4 solid solution related to the litiophylite-triphylite family, Anal. Quim. Int. Ed., 1998, vol. 94, p. 383-387.

J. Wolfenstine et al., Effect of oxygen partial pressure on the discharge capacity of LiCoPO4, Journal of Power Sources, 2005, vol. 144, p. 226-230.

D. Han et al., Effects of Fe doping on the electrochemical performance of LiCoPO4/C composites for high power-density cathode materials, 2008, vol. 11, p. 137-140.

K. Tadanaga et al., Preparation of LiCoPO4 for Lithium Battery Cathodes through Solution Process, Electrochemistry, 2003, vol. 71, p. 1192-1195.

N. Bramnik et al., Electrochemical and structural study of LiCoPO4-based electrodes, J. Solid State Electrochem, 2004, vol. 8, p. 558-564.

Amine et al., Olivine LiCoPO4 as 4.8 V Electrode Material for Lithium Batteries, Electrochemical and Solid State Letters, 2000, vol. 3, p. 178-179.

* cited by examiner

HIGH VOLTAGE LITHIUM ION POSITIVE ELECTRODE MATERIAL WITH IMPROVED CYCLE LIFE

CROSS REFERENCE TO RELATED APPLICATION

This application claims benefit of U.S. Provisional Patent Application No. 61/422,310, filed on Dec. 13, 2010, the complete disclosure of which, in its entirety, is herein incorporated by reference.

GOVERNMENT INTEREST

The embodiments described herein may be manufactured, used, imported and/or licensed by or for the United States Government without the payment of royalties thereon.

BACKGROUND

1. Technical Field

The invention herein generally relates to rechargeable lithium ion batteries and more particularly, to batteries having electrodes made from Fe-substituted $LiCoPO_4$.

2. Description of the Related Art

Electrochemical lithiated metal phosphate materials are finding increasing utility as components of electrodes for electrochemical devices, and in particular, as components of cathodes for rechargeable lithium-ion batteries. In the operation of such batteries, lithium ions are transferred, via an appropriate electrolyte, from the positive electrode (cathode) to the negative electrode (anode) during charging and from the anode to the cathode during discharge.

Lithiated metal phosphates have shown good thermal stability, low reactivity with electrolytes and have very good lithium transport and storage properties which allow for the manufacture of lithium ion batteries having large charge storage capability. Lithiated metal phosphates of the formula $LiMPO_4$, where M=Fe, Mn, Co or Ni, have been of strong interest for charge storage. See Pandi et al, J. Electrochem. Soc., Vol. 144, 1188-1194 (1997). The voltage of the electrochemical cell varies with M from 3.4 V for Fe, 4.1 V for Mn, 4.8 V for Co and 5.1 V for Ni. High voltage batteries, that could be obtained with $LiCoPO_4$, for example, are desirable because the stored energy is proportional to the voltage and the power is proportional to the square of the voltage. However, these higher voltage electrode materials and $LiCoPO_4$, in particular, have shown poor charge/discharge cycle life and relatively low electronic conductivity.

The prior art has implemented various approaches which have enhanced the electronic conductivity of these materials, such as coatings with conductive materials, synthesis under a reductive atmosphere and ball milling with conductive materials. However up until now, these electrode materials have demonstrated a poor cycle life.

SUMMARY

The present invention provides a high voltage substituted lithiated metal phosphate material having good cycle life. As such, the invention provides for the manufacture of improved electrodes in electrochemical devices, including rechargeable lithium ion batteries.

The invention includes material, which may be utilized in an electrode for an electrochemical device as well as electrodes which incorporate the material. The material has the general formula $Li_{1-3t}M^{2+}{}_{1-t-d}T_t{}^{3+}D_d{}^{2+}PO_4$, wherein M is selected from the group consisting of $Mn^{2+}$, $Co^{2+}$, $Ni^{2+}$ and combinations thereof; T is selected from the group consisting of $Fe^{3+}$, $Al^{3+}$ and $Ga^{3+}$ and a portion of said T resides at the M2 sites, said portion being greater than 0 and no more than 99 percent of the total T atoms; D is selected from the group consisting of $Fe^{2+}$, $Mn^{2+}$, $Co^{2+}$, $Ni^{2+}$, $Mg^{2+}$, $Zn^{2+}$, $Ca^{2+}$ and combinations thereof; d has a value greater than 0 and no more than 0.3; and t has a value in the range of 0 to 0.3.

In particular embodiments of the invention, the metal M is cobalt, while in other specific embodiments, M is a mixture of cobalt and at least one of the other metals in the group. In other specific embodiments, the metal D is also disposed at the M2 octahedral sites of the material. In further specific embodiments, the metal T is also disposed at both the M2 and M1 octahedral sites of the material.

The present invention also includes electrochemical cells which incorporate the electrodes of the present invention. Those electrochemical cells may comprise a lithium ion battery, wherein the electrode of the present invention is a cathode in said battery.

Finally, the invention includes a method for increasing the life cycle of an electrode in an electrochemical cell.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

Figure 1:
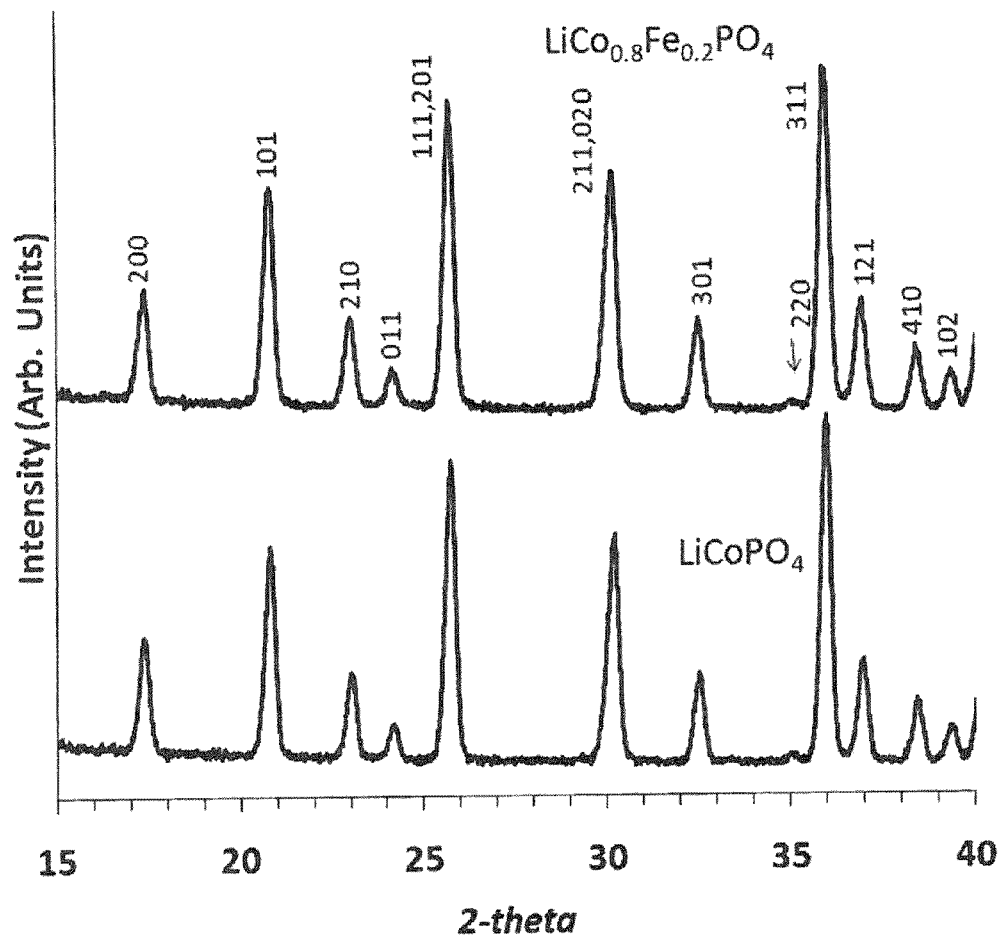
FIG. 1 shows an X-ray powder diffraction pattern of $LiCoPO_4$ (bottom curve) and the X-ray powder diffraction pattern of nominal composition $LiCo_{0.8}Fe_{0.2}PO_4$ (top curve).

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein Before describing the embodiments herein in detail, it is to be understood that the terminology used herein is for the purpose of describing particular embodiments only, and is not intended to be limiting.

The present invention is directed to lithium metal phosphate materials which have a good charge-discharge cycle life. The materials are useful as electro-active materials for electrochemical devices wherein lithium ion removal and insertion take place in the materials.

The materials of the present invention have a triphylite structure. In materials of this type, lithium occupies the M1 octahedral sites and cobalt occupies the M2 octahedral sites while phosphorus is at the tetrahedral sites of the material. In the materials of the present invention, some portion of a substituting trivalent ion such as $Fe^{3+}$, $Al^{3+}$ and $Ga^{3+}$ or combinations thereof is present at the M1, some portion of a substituting trivalent ion such as $Fe^{3+}$, $Al^{3+}$ and $Ga^{3+}$ or combinations thereof is present at the M2 and some portion of a substituting divalent ion such as $Fe^{2+}$, $Mn^{2+}$, $Co^{2+}$, $Ni^{2+}$, $Mg^{2+}$, $Zn^{2+}$, $Ca^{2+}$ or combinations thereof is present at the M2 site and as such, functions to increase the charge-discharge cycle life of the material. In general, the materials of the present invention are of the formula: $Li_{1-3d}M^{2+}_{1-t-d}T^{3+}_t D^{2+}_d PO_4$, wherein M is selected from the group consisting of $Mn^{2+}$, $Co^{2+}$, $Ni^{2+}$ and combinations thereof; T is selected from the group consisting of $Fe^{3+}$, $Al^{3+}$ and $Ga^{3+}$ and a portion of said T resides at the M2 sites, said portion being greater than 0 and no more than 99 percent of the total T atoms; D is selected from the group consisting of $Fe^{2+}$, $Mn^{2+}$, $Co^{2+}$, $Ni^{2+}$, $Mg^{2+}$, $Zn^{2+}$, $Ca^{2+}$ and combinations thereof; d has a value greater than 0 and no more than 0.3; and t has a value in the range of 0 to 0.3.

As noted above, the materials of the present invention have particular advantage as cathode materials for lithium ion batteries. As is known in the art, lithium is transferred from the cathode to the anode of the battery during charging and from the anode to the cathode during discharge. The typical battery includes an electrolyte which is capable of solvating the lithium ions, and it includes an anode which may be fabricated from a wide variety of materials which are compatible with the electrolyte and the cathode material. In the material of the present invention, substitution of a trivalent and a divalent atom stabilizes the triphylite structure during charge-discharge cycling and the configuration of the material of the present invention provides for high cycle life.

$LiCoPO_4$ was prepared for comparison to substituted samples. A typical X-ray diffraction pattern is shown as the lower curve in FIG. 1. The pattern confirms that a single crystalline phase $LiCoPO_4$ was prepared. A typical X-ray diffraction pattern is shown as the upper curve in FIG. 1 for a sample of nominal composition $LiCo_{0.8}Fe_{0.2}PO_4$. As with $LiCoPO_4$, there is no evidence of any impurity phases. Table 1, below, shows the lattice constants for a series of compounds.

TABLE 1

| Nominal composition | a, Å | b, Å | c, Å | Vol., Å$^3$ |
|---|---|---|---|---|
| $LiCoPO_4$ | 10.1950 | 5.9179 | 4.6972 | 283.39 |
| $LiCo_{0.95}Fe_{0.05}PO_4$ | 10.1913 | 5.9191 | 4.6983 | 283.42 |
| $LiCo_{0.9}Fe_{0.1}PO_4$ | 10.1925 | 5.921 | 4.6992 | 283.60 |
| $LiCo_{0.8}Fe_{0.2}PO_4$ | 10.1981 | 5.9262 | 4.6986 | 283.93 |

Figure 2:
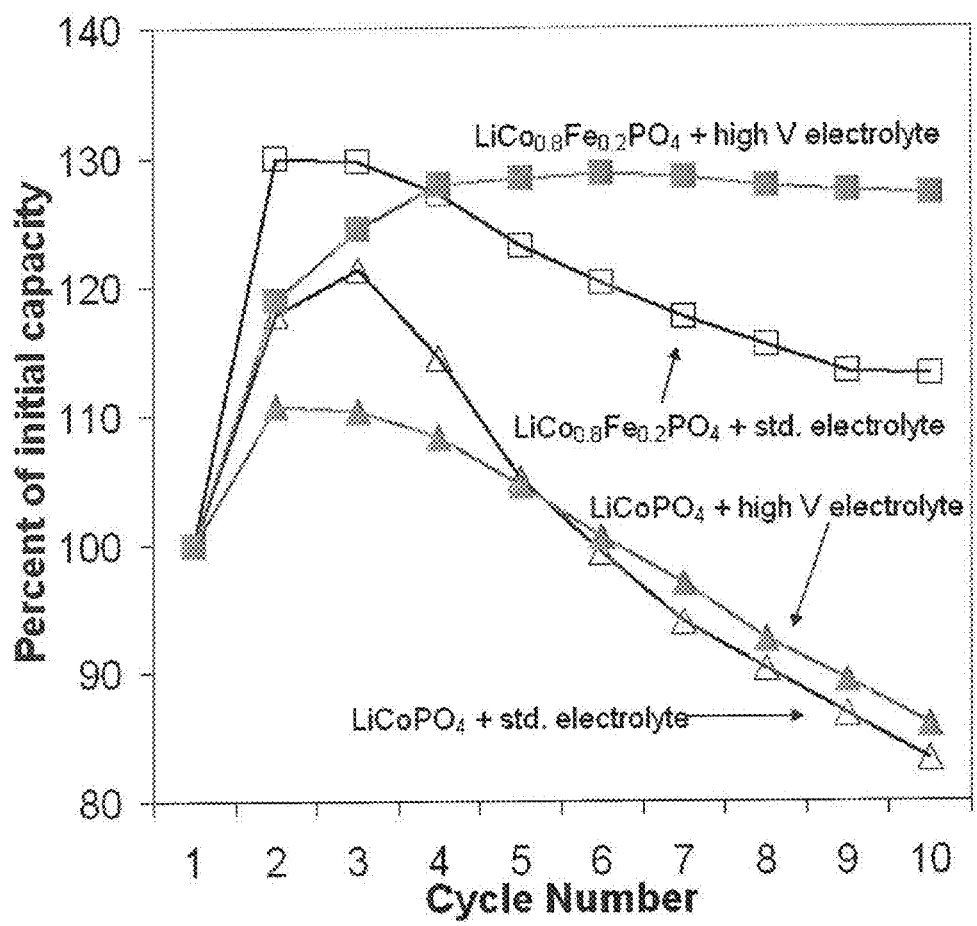
FIG. 2 shows the effect of $LiCoPO_4$ modification and HFiP electrolyte additive.

FIG. 2 demonstrates the effect of Fe substitution on the capacity fade and the importance of the tris(hexafluoroisopropyl)phosphate (HFiP) electrolyte additive. The nominal $LiFe_{0.2}Co_{0.8}PO_4$ composition was chosen to examine the cycle life since it had the largest capacity at the higher rate. The cells were cycled between 2 and 5.3 V via a constant current method at C/5 rate except for the first two cycles which used a C/10 rate. The time of charge was also limited to 10 h for C/10 rate and 5 h for C/5 rate so that during the first few cycles the discharge capacity increased after the solid electrolyte interphase (SEI) was formed on the cathode.

From FIG. 2, several points can be made. A standard Li-ion electrolyte (1 m $LiPF_6$ in 3:7 EC:EMC) was used to compare $LiCoPO_4$ (open triangles) to the nominal $LiCo_{0.8}Fe_{0.2}PO_4$ composition (open squares). For this case, it is clear that the Fe-substituted sample demonstrates considerable improvement in reducing capacity fade. However, capacity fade is still evident. Secondly, using a high voltage electrolyte (1 m $LiPF_6$ in 3:7 EC:EMC+1% HFiP additive), the capacity fade of the nominal $LiCo_{0.8}Fe_{0.2}PO_4$ composition (solid squares) was compared to the same composition with the standard electrolyte (open squares). For this comparison, there is additional decrease of the capacity fade with this change in electrolyte. Thirdly, in order to discriminate fully between the effect of the high voltage electrolyte and the substitutional effects, $LiCoPO_4$ with standard electrolyte (open triangles) was compared to $LiCoPO_4$ with the high voltage electrolyte (solid triangles). In this comparison, there is little discernible difference in the fading. Both samples evidence rapid capacity fade. The electrolyte has little effect. Thus, it is clear that structural decomposition of $LiCoPO_4$ or $CoPO_4$ is primarily responsible for the discharge capacity fade of the $LiCoPO_4$ electrode. In quantitative terms, about a 33% drop in capacity is observed between $LiCoPO_4$ (open triangles) and nominal $LiCo_{0.8}Fe_{0.2}PO_4$ (open circles) at the 10$^{th}$ cycle using a standard electrolyte. The drop in capacity between $LiCo_{0.8}Fe_{0.2}PO_4$ with high voltage electrolyte (solid squares) and $LiCo_{0.8}Fe_{0.2}PO_4$ with standard electrolyte (open squares) is 12%. Thus, the capacity fade is mainly a result of $LiCoPO_4$/$CoPO_4$ structural decomposition and, to a lesser degree, a result of electrolyte decomposition.

Figure 3:
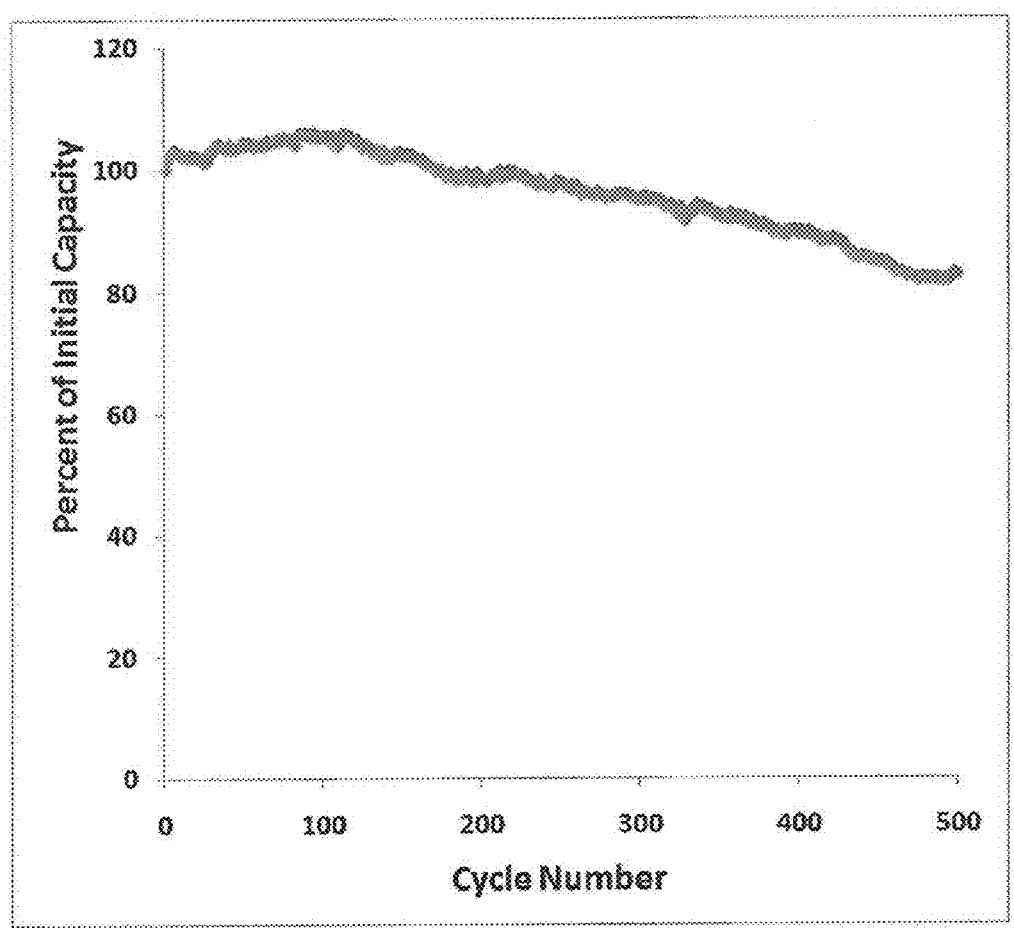
FIG. 3 shows the long term cycling of nominal composition $LiCo_{0.8}Fe_{0.2}PO_4$.

FIG. 3 shows the cycling performance of the nominal $LiCo_{0.8}Fe_{0.2}PO_4$ composition over 500 cycles in a coin cell with Li metal as the anode. The coulombic efficiency is about 97%. Approximately 100% capacity retention was observed at the 10$^{th}$ cycle and about 80% capacity retention at the 500$^{th}$ cycle.

Figure 4:
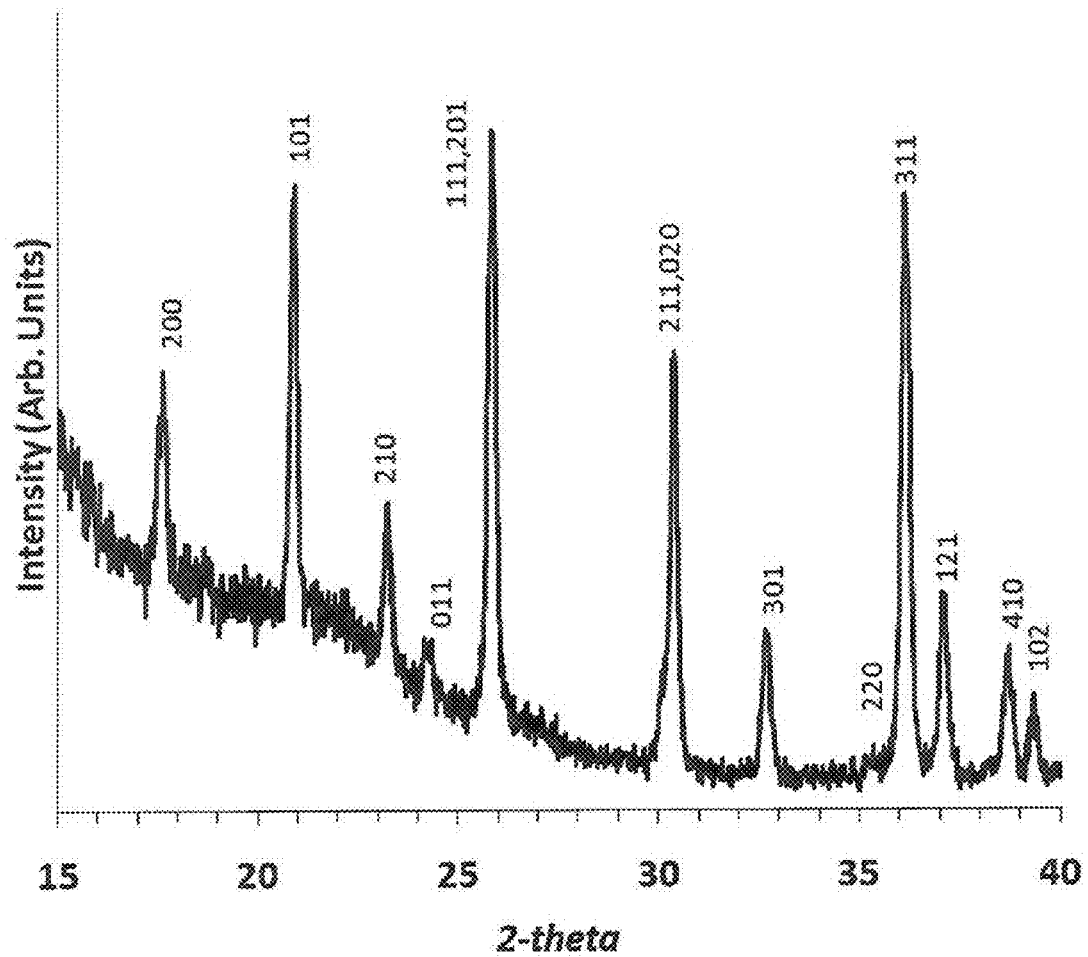
FIG. 4 shows the X-ray diffraction of $LiCo_{0.8}Fe_{0.2}PO_4$ after electrochemical cycling.

Referring to FIG. 4, the X-ray diffraction pattern of the cycled nominal $LiCo_{0.8}Fe_{0.2}PO_4$ cathode composite ($LiCO_{0.8}Fe_{0.2}PO_4$ with carbon and PVDF) on Al foil is shown. All peaks can be assigned to the $LiCoPO_4$ olivine structure, indicating structural integrity after cycling of the nominal $LiCo_{0.8}Fe_{0.2}PO_4$ strikingly different from the amorphization of $LiCoPO_4$ during cycling.

Figure 5:
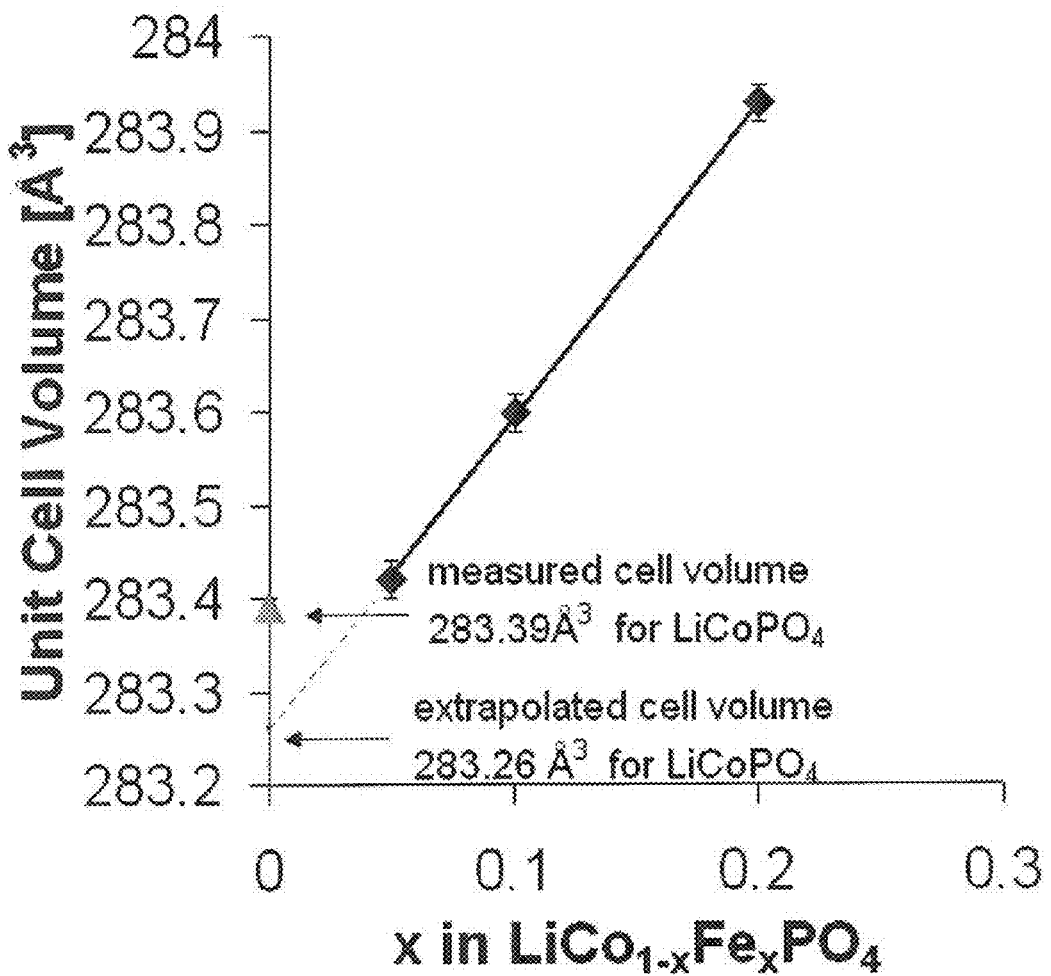
FIG. 5 shows the unit cell volume as a function of the nominal substitution of Co by Fe in $LiCoPO_4$.

FIG. 5 shows the effect on unit cell volume by the nominal substitution of Fe for $Co^{2+}$ in $LiCoPO_4$. The observed linear increase in unit cell volume is consistent with the larger unit cell volume of $LiFePO_4$ relative to $LiCoPO_4$. However, the line extrapolated to zero does not intercept at the unit cell volume of Fe free $LiCoPO_4$ as would be expected for $LiCo_{1-d}Fe_dPO_4$ where only $Fe^{2+}$ substitution for $Co^{2+}$ is observed. The "extrapolated volume" is 283.26 Å$^3$ and the measure volume is 283.39 Å$^3$. This smaller unit cell volume is believed to result from the substitution of smaller $Fe^{3+}$ for $Li^+$ and $Co^{2+}$.

Figure 6:
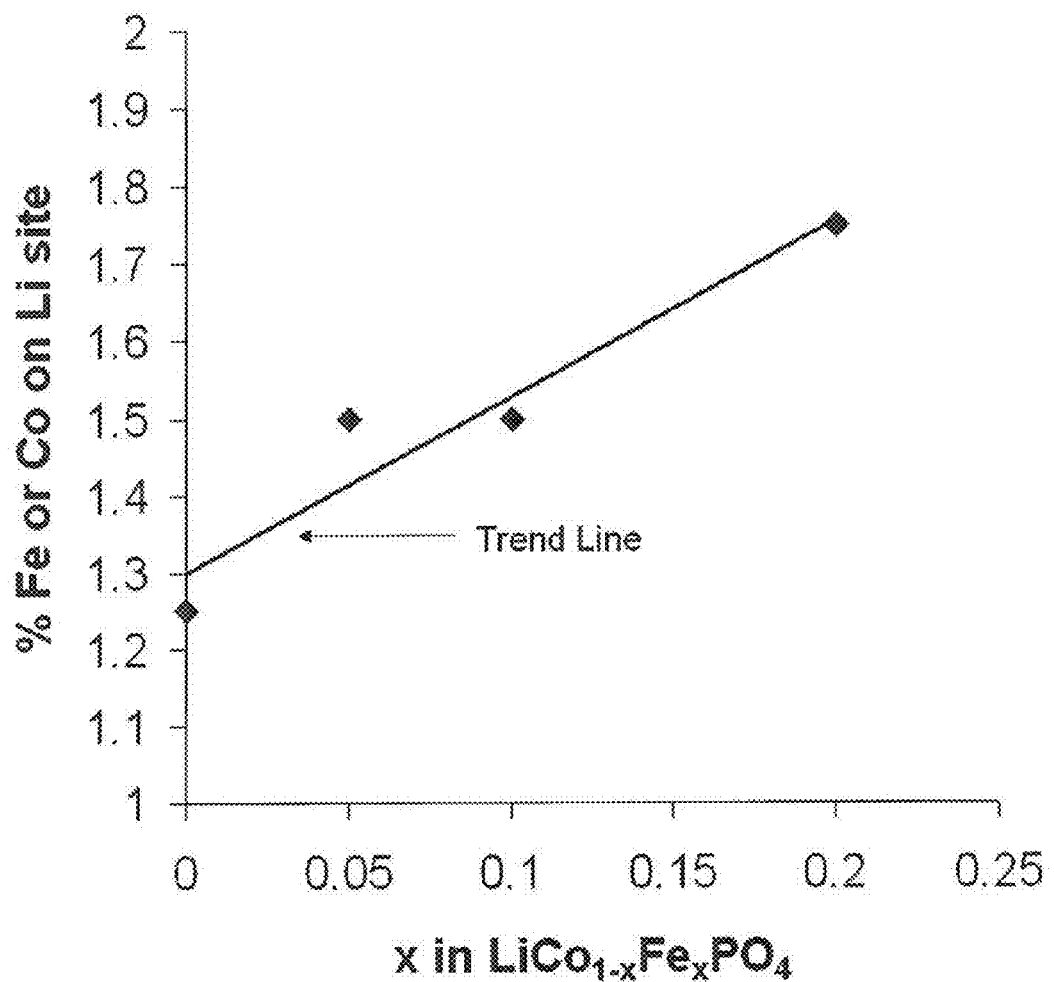
FIG. 6 shows the percent Fe or Co on Li site from Rietveld Refinement of X-ray diffraction data.

In order to support this conclusion, Rietveld refinements were done to look at the anti-site defects, e.g., $Fe^{3+}$ or $Co^{2+}$ on the Li site. The results are shown in FIG. 6. If only $Fe^{2+}$ substitution occurred in the Fe-substituted $LiCoPO_4$ samples, no difference in the site occupancy of lithium resulting from the change in the nominal composition would be expected. If $Fe^{3+}$ substitution occurs on the Li site, however, an increase in the anti-site defect concentration should be observed as the nominal Fe concentration increases. The Rietveld refinement shows that there is an increase in anti-site defects as the nominal concentration of Fe is increased relative to Co. Hence, this confirms that a small amount of $Fe^{3+}$ is substituting at the Li site (~1.8% for the nominal $LiCo_{0.8}Fe_{0.2}PO_4$ composition).

Figure 7:
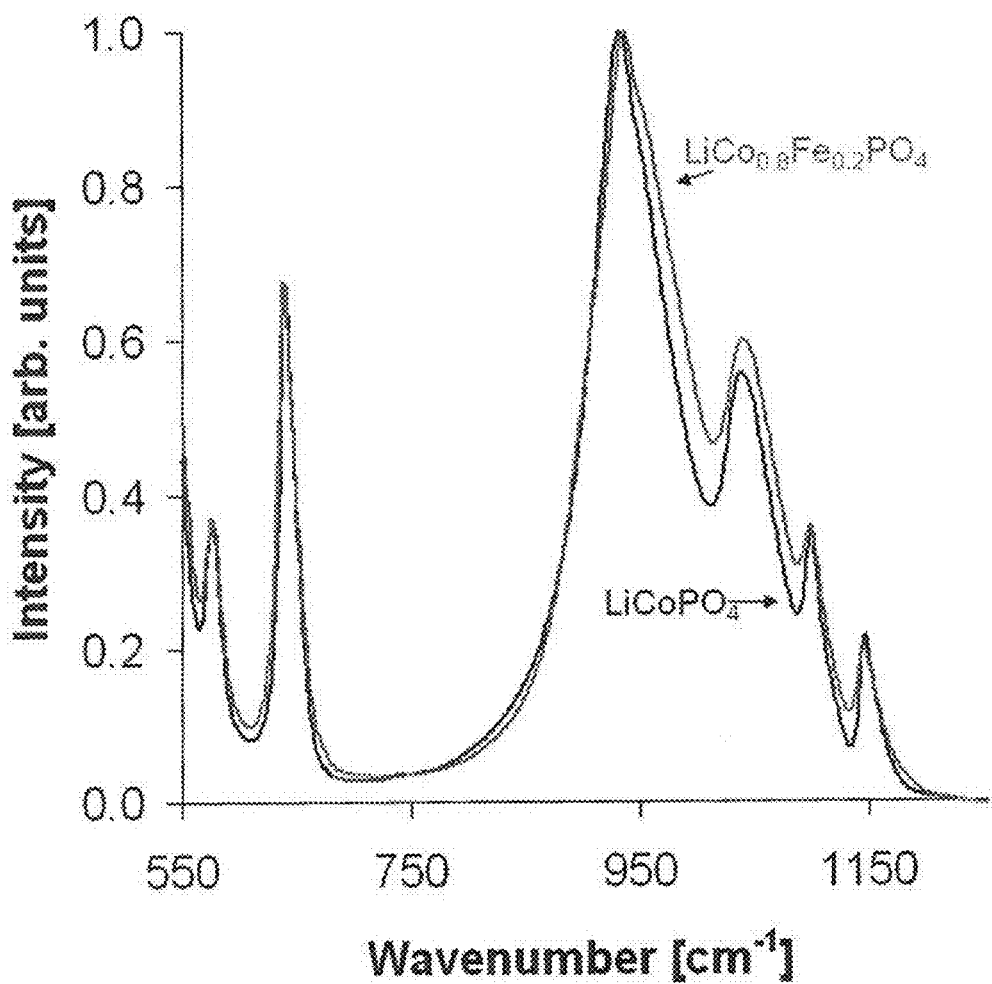
FIG. 7 shows the comparison of the infrared spectra of samples of nominal composition $LiCo_{0.8}Fe_{0.2}PO_4$ and $LiCoPO_4$.

The IR spectra of Fe-substituted $LiCoPO_4$ and $LiCoPO_4$ are shown in FIG. 7. A small broadening upon substitution of Li by $Fe^{3+}$ was observed.

Figure 8:
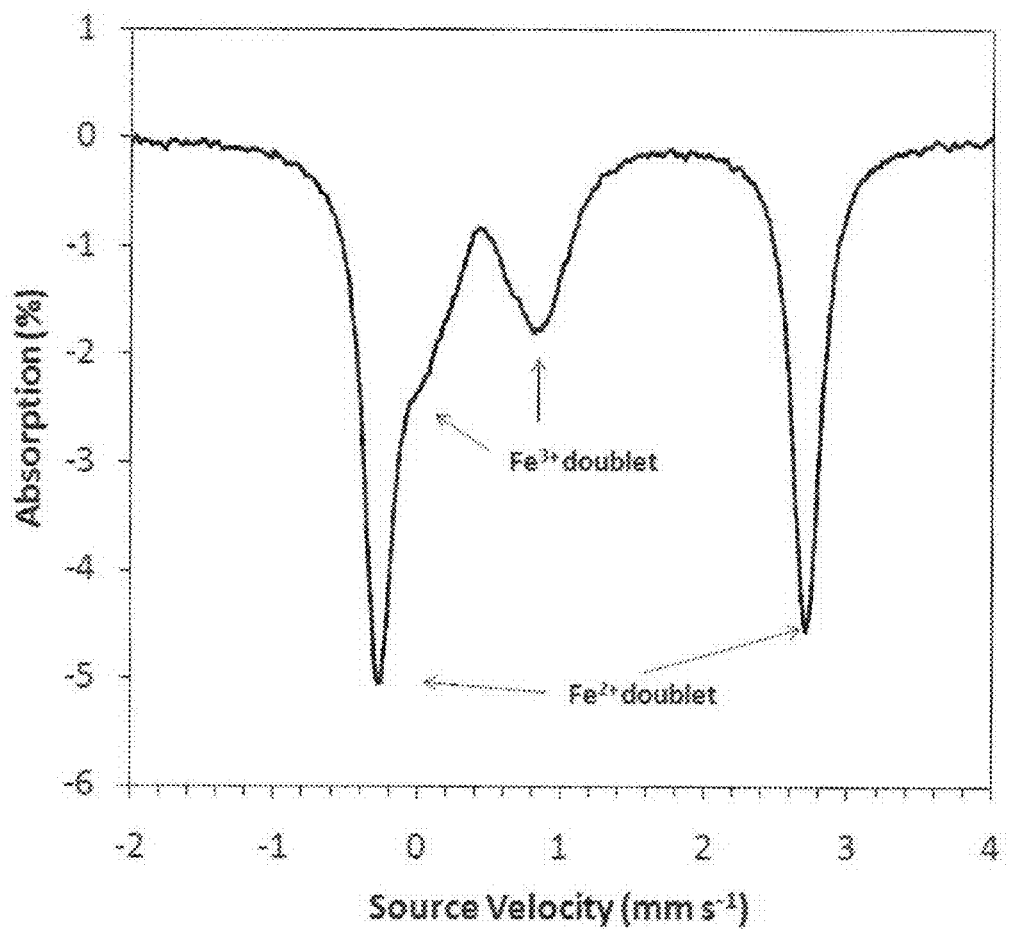
FIG. 8 shows the Mössbauer spectrum of nominal composition $LiCo_{0.8}Fe_{0.2}PO_4$.

The room temperature Mössbauer spectrum of nominal composition $LiCo_{0.8}Fe_{0.2}PO_4$ is shown in FIG. 8. First, the peaks are identified as follows: the doublet with the larger splitting (3.0 mm/s) is typical high spin (S=2) $Fe^{2+}$. The doublet with the smaller splitting (0.8 mm/s) and shift (0.44 mm/s) is typical high spin (S=5/2) $Fe^{3+}$. Secondly, the sharpness of the peaks gives information about the local environment. The $Fe^{2+}$ lines are very sharp indicating that $Fe^{2+}$ exclusively sits at one site, the Co site of $LiCoPO_4$. The lines of the $Fe^{3+}$ doublet are broad indicating that $Fe^{3+}$ sits at both the Li and the Co sites of $LiCoPO_4$. Thirdly, from the area of the peaks, the relative ratio of $Fe^{2+}/Fe^{3+}$ can be quantified. The Mössbauer spectrum yields 60% $Fe^{2+}$ and 40% $Fe^{3+}$ in excellent agreement with the thermogravimetric measurement of 58% $Fe^{2+}$ and 42% $Fe^{3+}$.

Finally, since the $Fe^{3+}$ will be most likely compensated by $Li^+$ ion vacancies, the ratio of Li/(Fe+Co) determined via ICP-OES at Galbraith Laboratories, Inc. can also be used to calculate the amount of $Fe^{3+}$ in the sample. This atomic ratio was measured to be 0.91, which is calculated to indicate 55% $Fe^{2+}$ and 45% $Fe^{3+}$. The analysis of the $Fe^{2+}/Fe^{3+}$ ratio by 3 independent methods and 3 different laboratories is summarized in Table 2, below.

TABLE 2

| Analysis Method | Atom % $Fe^{2+}$ of total Fe | Atom % $Fe^{3+}$ of total Fe | Laboratory of data collection |
|---|---|---|---|
| Thermogravimetric | 58 | 42 | ARL |
| Mössbauer | 60 | 40 | SEE Co. |
| ICP-OES | 55 | 45 | Galbraith Lab Inc. |
| AVERAGE | ~58 | ~42 | |

X-ray diffraction (FIG. 1), Infrared spectroscopy (FIG. 7) and Mössbauer spectroscopy (FIG. 8) of a material of overall formula $Li_{0.9}Co_{0.8}Fe_{0.2}PO_4$ confirm that the triphylite structure is formed and that $Fe^{2+}$ substitutes for Co on the M2 site and that $Fe^{3+}$ substitutes for Li on the M1 site. The data confirms the substitution of $LiCoPO_4$ Rietveld refinements.

A specific example of materials of the present invention and their method of preparation are set forth hereinbelow, it being understood that this example is illustrative of, but is not intended to limit the practice of the present invention.

Example $LiCoPO_4$ samples were prepared via a citrate complexation route. $Co(OH)_2$, $LiH_2PO_4$, and citric acid, 1, 1.01, 1.02, molar ratio, respectively, were mixed into deionized water until all solids were dissolved. The resulting solution was evaporated to dryness via a microwave oven. The dried mass powder mixture was removed, ground lightly with mortar and pestle and heated in air at a rate of 10° C. min$^{-1}$ to 600° C. and the reactant mixture was held at this temperature for 12 hours.

In order get Fe substitution on both the Li and Co sites, $Co(OH)_2$, $LiH_2PO_4$ and $FeC_2O_4 \cdot 2H_2O$ with a nominal stoichiometry of $LiCo_{1-x}Fe_xPO_4$, x=0.05, 0.1, 0.2 were weighed and then dissolved in 1 M $HNO_3$ (aq). The resulting nitrate solution was evaporated to dryness via a microwave oven in a fume hood and then heated under $N_2$ at a rate of 10° C. min$^{-1}$ to 600° C. and held at this temperature for 12 hours. During the decomposition of the co-precipitated nitrates, the decomposition of the nitrate ion provided an oxidizing component to the $N_2$ atmosphere which transformed a portion of the $Fe^{2+}$ to $Fe^{3+}$.

Carbon coating to improve electronic conductivity was done by ball milling the samples of $LiCoPO_4$ and Fe-substituted $LiCoPO_4$ for 30 minutes with 5% by mass acetylene black, followed by heating for 1 hour at 600° C. under $N_2$.

Phase purity was evaluated using X-ray powder diffraction. Data were collected using a Rigaku Ultima III diffractometer. Lattice constants were calculated from peak positions using Rietveld refinement of the pattern collected in a parallel beam geometry or with the use of a NIST certified silicon standard for collection in a Bragg-Brentano geometry using Riqas software (Materials Data Inc.). Samples were further evaluated spectroscopically using Attenuated Total Reflectance Fourier-Transform Infrared (ATR-FTIR) Spectroscopy, X-ray Photoelectron Spectroscopy (XPS) to evaluate site occupancy and oxidation states, respectively. Additional information about the oxidation state of Fe was obtained from Mössbauer spectroscopy (collected at See Company, Edina, Mn), gravimetric analysis of a sample heated in air and elemental analysis via inductively coupled plasma optical emission spectroscopy (ICP-OES, data collected at Galbraith Laboratories, Inc.).

For electrochemical testing, a composite electrode was fabricated by a slurry coating method. Using N-methylpyrrolidone (NMP) as a solvent, a slurry was used to coat an Al foil substrate to produce a composite electrode of 80 wt. % active, 10 wt. % polyvinylidene fluoride (PVDF) and 8 wt. % super-P carbon and 2 wt. % conductive carbon nanotube composite (CheapTubes.com). The electrode film was cut into small discs with an area of 0.97 cm$^2$, dried under an infrared lamp in air before use and thereafter in a heated vacuum oven (~100° C.). In a dry room (Dew point<–80° C.), Li/active coin cells (Hohsen Al-clad CR2032) were assembled using Celgard® 3501 as the separator and a 1.0 molal $LiPF_6$ solution in a 3:7 (wt. %) mixture of ethylene carbonate (EC) and ethyl methyl carbonate (EMC) electrolyte with and without 1 wt. % HFiP. Electrochemical testing was performed using a Maccor Series 4000 tester. For calculation of C-rate, a capacity of ~170 mA h g$^{-1}$ was assumed.

For comparison, a sample of $LiCoPO_4$ was similarly prepared, coated and electrochemically tested. Results of this comparison are shown in FIG. 4.

The forgoing example describes materials where cobalt is the sole metal defined by M in the formula, $Fe^{3+}$ is the sole metal defined by T, and $Fe^{2+}$ is the sole metal defined by D. It is to be understood that the formulations including other metals such as Mn and Ni for M, $Al^{3+}$, $Ga^{3+}$ for T, and $Mn^{2+}$, $Co^{2+}$, $Ni^{2+}$, $Mg^{2+}$, $Zn^{2+}$, $Ca^{2+}$ for D may be similarly prepared. In some instances, materials of the present invention may include a mixture of these metals therein.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. An electrode for an electrochemical cell, said electrode comprising a compound of the formula of $Li_{1-3t}M^{2+}_{1-t-d}T^{3+}_{t}D^{2+}_{d}PO_4$, wherein M is selected from the group consisting of $Mn^{2+}$, $Co^{2+}$, $Ni^{2+}$ and combinations thereof; T is selected from the group consisting of $Fe^{3+}$, $Al^{3+}$ and $Ga^{3+}$ and a portion of said T resides at both M1 and M2 sites, said portion being greater than 0 and no more than 99 percent of the total T atoms; D is selected from the group consisting of $Fe^{2+}$, $Mn^{2+}$, $Co^{2+}$, $Ni^{2+}$, $Mg^{2+}$, $Zn^{2+}$, $Ca^{2+}$ and combinations thereof; d has a value greater than 0 and no more than 0.3; and t has a value greater than 0 and no more than 0.3.

2. The electrode of claim 1 comprising a compound of the formula of $Li_{1-3t}M^{2+}_{1-t-d}T^{3+}_{t}D^{2+}_{d}PO_4$ wherein M is $Co^{2+}$.

3. The electrode of claim 2 comprising a compound of the formula of $Li_{1-3t}Co^{2+}_{1-t-d}T^{3+}_{t}D^{2+}_{d}PO_4$ wherein T is $Fe^{3+}$.

4. The electrode of claim 2 comprising a compound of the formula of $Li_{1-3t}Co^{2+}_{1-t-d}T^{3+}_{t}D^{2+}_{d}PO_4$ wherein D is $Fe^{2+}$.

5. The electrode of claim 1 comprising a compound of the formula of $Li_{1-3t}M^{2+}_{1-t-d}T^{3+}_{t}D^{2+}_{d}PO_4$ wherein M is $Mn^{2+}$.

6. The electrode of claim 1 comprising a compound of the formula of $Li_{1-3t}M^{2+}_{1-t-d}T^{3+}_{t}D^{2+}_{d}PO_4$ wherein M is $Ni^{2+}$.

7. The electrode of claim 1 made out of $LiCo_{0.8}Fe_{0.2}PO_4$.

8. The electrode of claim 1 made out of $LiCo_{0.9}Fe_{0.1}PO_4$.

9. The electrode of claim 1 made out of $LiCo_{0.95}Fe_{0.05}PO_4$.

10. A method of forming the electrode for an electrochemical cell according to claim 1, the method comprising:

mixing and dissolving $LiH_2PO_4$, $Co(OH)_2$ and $FeC_2O_4 \cdot 2H_2O$ in $HNO_3$;

evaporating the water from this solution to form a solid powder mixture;

heating said mixture to around 600° C. under $N_2$ for approximately 12 hours;

cooling the heated mixture;

ball milling for about 30 minutes the mixture with 0.01-10 wt. % acetylene black;

heating the mixture again to around 600° C. under $N_2$ for about an hour; and then coating the mixture onto an Al foil substrate to produce a composite electrode so as produce said electrode.

11. A rechargeable battery having one or more electrochemical cells which include an electrode comprising a compound of the formula of $Li_{1-3t}M^{2+}_{1-t-d}T^{3+}_{t}D^{2+}_{d}PO_4$, wherein M is selected from the group consisting of $Mn^{2+}$, $Co^{2+}$, $Ni^{2+}$ and combinations thereof; T is selected from the group consisting of $Fe^{3+}$, $Al^{3+}$ and $Ga^{3+}$ and a portion of said T resides at both M1 and M2 sites, said portion being greater than 0 and no more than 99 percent of the total T atoms; D is selected from the group consisting of $Fe^{2+}$, $Mn^{2+}$, $Co^{2+}$, $Ni^{2+}$, $Mg^{2+}$, $Zn^{2+}$, $Ca^{2+}$ and combinations thereof; d has a value greater than 0 and no more than 0.3; and t has a value greater than 0 and no more than 0.3.

12. The battery of claim 11 having an electrochemical cell which includes an electrode comprising a compound of the formula of $Li_{1-3t}M^{2+}_{1-t-d}T^{3+}_{t}D^{2+}_{d}PO_4$ wherein M is $Co^{2+}$.

13. The battery of claim 12 having an electrochemical cell which includes an electrode comprising a compound of the formula of $Li_{1-3t}Co^{2+}_{1-t-d}T^{3+}_{t}D^{2+}_{d}PO_4$ wherein T is $Fe^{3+}$.

14. The battery of claim 12 having an electrochemical cell which includes an electrode comprising a compound of the formula of $Li_{1-3t}Co^{2+}_{1-t-d}T^{3+}_{t}D^{2+}_{d}PO_4$ wherein D is $Fe^{2+}$.

15. The battery of claim 11 having an electrochemical cell which includes an electrode comprising a compound of the formula of $Li_{1-3t}M^{2+}_{1-t-d}T^{3+}_{t}D^{2+}_{d}PO_4$ wherein M is $Mn^{2+}$.

16. The battery of claim 11 having an electrochemical cell which includes an electrode comprising a compound of the formula of $Li_{1-3t}M^{2+}_{1-t-d}T^{3+}_{t}D^{2+}_{d}PO_4$ wherein M is $Ni^{2+}$.

17. The battery of claim 11 having an electrochemical cell which includes a cathode made out of $LiCo_{0.8}Fe_{0.2}PO_4$.

18. The battery of claim 11 having an electrochemical cell which includes a cathode made out of $LiCo_{0.9}Fe_{0.1}PO_4$.

19. The battery of claim 11 having an electrochemical cell which includes a cathode made out of $LiCo_{0.95}Fe_{0.05}PO_4$.

* * * * *